United States Patent
Bengston

(10) Patent No.: US 6,728,947 B1
(45) Date of Patent: Apr. 27, 2004

(54) WORKFLOW DISTRIBUTING APPARATUS AND METHOD

(75) Inventor: Michael B. Bengston, Frankfort, IL (US)

(73) Assignee: R. R. Donnelley & Sons Company, Chicago, IL (US)

(*) Notice: Subject to any disclaimer, the term of this patent is extended or adjusted under 35 U.S.C. 154(b) by 0 days.

(21) Appl. No.: 09/092,377

(22) Filed: Jun. 5, 1998

(51) Int. Cl.⁷ .................................................. G06F 9/44
(52) U.S. Cl. ............................ 717/103; 705/8; 705/10; 709/203
(58) Field of Search ............................... 709/202, 223, 709/224, 228; 705/11; 345/326, 329, 330, 334, 335; 717/100

(56) References Cited

U.S. PATENT DOCUMENTS

| | | | | |
|---|---|---|---|---|
| 3,736,409 A | | 5/1973 | Boyan .......................... 235/61.6 |
| 4,462,075 A | * | 7/1984 | Mori et al. .................... 709/202 |
| 4,495,582 A | | 1/1985 | Dessert et al. ............... 364/469 |
| 4,803,634 A | | 2/1989 | Ohno et al. ................... 364/478 |
| 4,839,829 A | | 6/1989 | Freedman ..................... 364/519 |
| 4,948,109 A | | 8/1990 | Petersen ........................ 270/1.1 |
| 5,091,849 A | | 2/1992 | Davis et al. ................... 395/100 |
| 5,101,474 A | | 3/1992 | Schlegel et al. .............. 395/114 |
| 5,132,915 A | | 7/1992 | Goodman ..................... 364/479 |
| 5,140,537 A | | 8/1992 | Tullis ............................ 364/578 |
| 5,155,808 A | * | 10/1992 | Shimizu ....................... 709/202 |
| 5,182,705 A | | 1/1993 | Barr et al. .................... 364/401 |
| 5,233,513 A | | 8/1993 | Doyle .......................... 354/401 |
| 5,249,120 A | | 9/1993 | Foley ........................... 364/401 |
| 5,301,320 A | | 4/1994 | McAtee et al. .............. 395/650 |
| 5,319,543 A | | 6/1994 | Wilhelm ....................... 364/401 |
| 5,410,651 A | * | 4/1995 | Sekizawa et al. ............ 709/224 |
| 5,414,837 A | | 5/1995 | Kotatsu ........................ 395/600 |
| 5,467,436 A | | 11/1995 | Rodi et al. ................... 395/114 |
| 5,553,281 A | | 9/1996 | Brown et al. ................ 395/600 |
| 5,561,802 A | * | 10/1996 | Orimo et al. ................. 709/202 |
| 5,570,291 A | | 10/1996 | Dudle et al. ............. 364/468.01 |
| 5,625,758 A | | 4/1997 | Schneider et al. ........... 395/114 |
| 5,627,764 A | | 5/1997 | Schutzman et al. ...... 364/514 R |
| 5,630,069 A | | 5/1997 | Flores et al. ................. 395/207 |
| 5,634,127 A | | 5/1997 | Cloud et al. ................. 395/680 |
| 5,649,220 A | | 7/1997 | Yosefi et al. ................. 707/526 |
| 5,668,993 A | | 9/1997 | Peters et al. ................. 395/671 |
| 5,687,373 A | | 11/1997 | Holmes et al. .............. 395/682 |
| 5,699,523 A | * | 12/1997 | Li et al. ....................... 709/238 |
| 5,701,484 A | | 12/1997 | Artsy ........................... 395/683 |
| 5,721,943 A | | 2/1998 | Johnson ....................... 395/674 |
| 5,734,837 A | | 3/1998 | Flores et al. ................. 395/207 |
| 5,745,687 A | | 4/1998 | Randell ........................ 395/200 |
| 5,745,901 A | | 4/1998 | Entner et al. ................ 707/103 |
| 5,774,661 A | * | 6/1998 | Chatterjee et al. ........... 709/238 |
| 5,826,020 A | * | 10/1998 | Randell ........................ 709/202 |
| 5,918,226 A | * | 6/1999 | Tarumi et al. |
| 5,960,404 A | * | 9/1999 | Chaar et al. ..................... 705/8 |
| 5,978,836 A | * | 11/1999 | Ouchi |
| 6,041,343 A | * | 3/2000 | Nguyen et al. .............. 709/203 |
| 6,070,253 A | * | 5/2000 | Tavallaei et al. ............ 709/223 |
| 6,073,109 A | * | 6/2000 | Flores et al. ..................... 705/8 |

FOREIGN PATENT DOCUMENTS

| | | | | |
|---|---|---|---|---|
| EP | 001241605 A2 | * | 11/2001 | ........... G06F/17/60 |
| EP | 001293924 A2 | * | 1/2002 | ........... G06F/17/60 |
| EP | 001278148 A1 | * | 8/2002 | ........... G06F/17/60 |
| GB | 002377777 A | * | 1/2003 | ........... G06F/17/60 |

OTHER PUBLICATIONS

Template Software Process Template, Using the WFT Development Environment, version 8.0, released Apr. 1997, Chapters 1–9□□.*
Template Software SNAP Foundation Template Getting Started With SNAP, Version 8.0, pp. 5–27–5–29, 1998.*
Template Software SNAP Foundation Template, "Getting Started with SNAP" whole manual, 1998.*
Abstract: Au 8541473 A.
5079695: Object management facility which includes a snapshot facility for providing data transfer between two objects (visited Jun. 17, 1997) <http://patent.womplex.ibm.com/claims?patent_No.=5079695>.
Patents that reference patent 5079695: (visited Jun. 17, 1997) <http://patent.womplex.ibm.com/cgi–bin/db2 . . . /forwref.d2w/report?patent_No.=5079695>.
5386564: Conversion of data and objects across classes in an object management system (visited Jun. 17, 1997) <http://patent.womplex.ibm.com/claims?patent_No.=5386564>.
5386584: Conversion of data and objects across classes in an object management system (visited Jun. 17, 1997) <http://patent.womplex.ibm.com/details?patent_No.=5386564>.
4962475: Method for generating a document utilizing a plurality of windows associated with different data objects (visited Jun. 17, 1997) <http://patent.womplex.ibm.com/claims?patent_No.=4962475>.
5233513: Business modeling, software engineering and prototyping method and apparatus (visited Jun. 17, 1997) <http://patent.womplex.ibm.com/claims?patent_No.=5233513>.
5297279: System and method for database management supporting object–oriented programming (visited Jun. 17, 1997) <http://patent.womplex.ibm.com/claims?patent_No.=5297279>.

(List continued on next page.)

Primary Examiner—Todd Ingberg
(74) Attorney, Agent, or Firm—Marshall, Gerstein & Borun LLP

(57) ABSTRACT

A system and apparatus for automatically executing process steps by processing devices transmitted, over a communication channel, using a workflow file to specify the process steps. Devices are used to edit, initiate, and observe workflow execution. Editing comprises selecting process steps, executing parameter selection software supplied by the processing device, and drawing links between icons. Once workflow execution is initiated, workflow data is passed from one processing device to the next. Each processing device performs the process step specified by the workflow file with the selected parameters and optionally sends status information to observing devices. This sequence continues until all process steps are executed or an error occurs.

15 Claims, 8 Drawing Sheets

OTHER PUBLICATIONS

*Patents that reference patent 5297279:* (visited Jun. 17, 1997) <http://patent.womplex.ibm.com/cgi–bin/db2 . . . /forwref.d2w/report?patent_No.=5297279>.

*5208748: Method and apparatus for structuring and managing human communications by explicitly defining the types of communications permitted between participants* (visited Jun. 18, 1997) <http://patent.womplex.ibm.com/details?patent_No.=5208748>.

*5208748: Method and apparatus for structuring and managing human communications by explicitly defining the types of communications permitted between participants* (visited Jun. 18, 1997) <http://patent.womplex.ibm.com/claims?patent_No.=5208748>.

*5216603: Method and apparatus for structuring and managing human cmmunications by explicitly defining the types of communications permitted between participants* (visited Jun. 18, 1997) <http://patent.womplex.ibm.com/details-?patent_No.=5216603>.

*Action Technologies Announces First Web–Based Workflow Applications* (visited Jun. 18, 1997) <http://www.actiontech.com/market/press/ATI–17.htm>.

*Process Builder: Demonstration* (visited Jun. 18, 1997) <http://www.actiontech.com/analyst/demo/index.html>.

*Your Job Is Complex . . .* (visited Jun. 18, 1997) <http://www.actiontech.com/analyst/demo/page2.html>.

*Your Job Is Complex . . . Your Mapping Tool Shouldn't Be.* (visited Jun. 18, 1997) <http://www.actiontech.com/analyst/demo/page3.html>.

*Need A Picture? Use "Flowchart" Software.* (visited Jun. 18, 1997) <http://www.actiontech.com/analyst/demo/page4.html>.

*Need A Picture? Use "Flowchart" Software. Need A Process Map? Use Process Builder* (visited Jun. 18, 1997) <http://www.actiontech.com/analyst/demo/page5.html>.

*Clear Graphics Means Better Communication.* (visited Jun. 18, 1997) <http://www.actiontech.com/analyst/demo/page 6.html>.

*Clear Graphics Means Better Communication. Clear Communication Provides the Best Feedback* (visited Jun. 18, 1997) <http://www.actiontech.com/analyst/demo/page7.html>.

*You've made your process better.* (visited Jun. 18, 1997) <http://www.actiontech.com/analyst/demo/page8.html>.

*You've made your process better. Now Make It Fly!* (visited Jun. 18, 1997) <http://www.actiontech.com/analyst/demo/page9.html>.

*Discover . . . Communicate . . . Improve . . . and Automate!* (visited Jun. 18, 1997) <http://www.actiontech.com/analyst/demo/page10.html>.

*Lotus Notes: An Overview* (visited Jul. 28, 1997) <http://www.lotus.com/notesr4/over2d.htm>.

*Lotus Notes and the Internet* (visited Jul. 28, 1997) <http://www.lotus.com/notesr4/inter.htm>.

*The Workflow Management Coalition Specification* (visited May 22, 1997) <http://www.aiai.ed.ac.uk/project/wfmc/DOCS/glossary/glossary.html>.

*Mapping Your Web* (visited Jun. 18, 1997) <http://www.actiontech.com/analyst/info/mapping.html>.

*Process Builder* (visited Jun. 18, 1997) <http://www.actiontech.com/analyst/info/brochure.html>.

*It's All in the Process* (visited Jun. 18, 1997) <http://www.actiontech.com/analyst/info/process.html>.

*Definition: Application Builder Tools* (visited Jun. 10, 1997) <http://java.sun.com:80/docs/books/tutorial/beans/whatis/builder–tools.html>.

*IBM, Netscape, Oracle and Sun Unite to Bring CORBA and JavaBeans Together* (visited Jun. 10, 1997) <http://home.netscape.com/flash2/newsref/pr/newsrelease422.html>.

*Why Java™ Technology is So Important* (visited Apr. 29, 1998) <http://www.javasoft.com/nav/whatis/where-how.html>.

*What Java™ Technology Means to Business, Developers, Consumers* (visited Apr. 29, 1998) <http://www.javasoft.com/nav/whatis/whatjavameans.html>.

Martin Hardee, *Java Technology Town At CES* (last modified Jan. 9, 1998) <http://www.javasoft.com/features/1998/01/javatown.html>.

*A Lightweight, Distributed Model* (visited Apr. 29, 1998) <http://www.javasoft.com/nav/whatis/lightweight.html>.

*The Choice Is Clear: Write to JavaBeans* (visited Apr. 29, 1998) <http://www.javasoft.com/beans/>.

*Mt. Sinai Medical Center: Automating Workflow To Boost Efficiency* (visited Apr. 29, 1998) <http://java.sun.com/features/1997/oct/leg_sinai.html>.

*What is the Java™ Platform?* (visited Apr. 28, 1998) <http://www.javasoft.com/nav/whatis/index.html>.

*How the Java™ Platform Works* (visited Apr. 28, 1998) <http://www.javasoft.com/hav/whatis/howitworks.html>.

Randy Weston, *Fujitsu's Java workflow system* (last modified Aug. 17, 1998) <http://www.news.com/News/Item/0,4,25325,00.html?owv>.

*i–Flow* (visited Aug. 19, 1998) <http://www.i–flow.com/>.

Randy Weston, *Newscape finds groupware niche* (modified Aug. 12, 1998) <http://www.news.com/News/Item/0,4,25213,00.html>.

Erich Luening, *Workflow software standard backed* (modified Apr. 13, 1998) <http://www.news.com/News/Item/0,4,21020,00.html?st.ne.ni.rel>.

Erich Luening, *Novell's new tool maps workflow* (modified Dec. 10, 1997) <http://www.news.com/News/Item/0,4,17205,00.html?st.ne.ni.re.>.

Erich Luening, *Microsoft teams on groupware* (modified Mar. 17, 1998) <http://www.news.com/News/Item/0,4,20141,00.html?st.ne.ni.re.>.

*Logic* (visited Oct. 2, 1998) <http://www.zlogic.com/>.

*About Logic* (visited Oct. 2, 1998) <http://www.zlogic.com/.aboutlog.htm>.

*About the Logic Management System* (visited Oct. 2, 1998) <http://www/zlogic.com/lasystem.htm>.

*LMS Network Architecture* (visited Oct. 2, 1998) >http://www.zlogic.com/archture.htm>.

*Integration in the LMS* (visited Oct. 2, 1998) <http://www.zlogic.com/integrat.htm>.

*Operation Management* (visited Oct. 2, 1998) <http:/www.zlogic.com/opermgmt.htm>.

*Production Management* (visited Oct. 2, 1998) <http://www.zlogic.com/prodmgmt.htm>.

*Material Management* (visited Oct. 2, 1998) <http://www-.zlogic.com/matlmgmt.htm>.

*Financial Management* (visited Oct. 2, 1998) <http://www.zlogic.com/finamgmt.htm>.

*Network Products* (visited Oct. 2, 1998) <http://www.zlogic.com/netprods.htm>.

*Frequently Asked Questions About the LMS* (visited Oct. 2, 1998) <http://www.zlogic.com/lmsfaq.htm>.

\* cited by examiner

```
/* Sample workflow to print a file and notify one person
by pager message of success and another person by pager
message of an error */

Next_Process = "Print"

Identification:
    Name = "Print"
    Address = "RRDonnelly.com/print_process"
Parameters:
    File = "customer.com/file1"
    Font = "Times"
Publish:
    File_Name =
    Error_Message =
Links:
    Normal = "Page1"
    Error = "Page2"
Status:
    Start = 3/3/98 2:56:03 PM
    End = 3/3/98 2:56:21 PM Identification:
    Name = "Page1"
    Address = "SkyPage.com/page_process"
Parameters:
    PIN = "1234"
    Message = "The file" & Print.File_Name & "is ready"
Publish:
Links:
    Normal = STOP
Status:
    Start =
    End =

Identification:
    Name = "Page2"
    Address = "SkyPage.com/page_process"
Parameters:
    PIN = "4567"
    Message = Print.Error_Message
Publish:
Links:
    Normal = STOP
Status:
    Start =
    End =
```

FIG. 3

WORKFLOW DISTRIBUTING APPARATUS AND METHOD

TECHNICAL FIELD

The present invention relates in general to automated systems and in particular to independently controlled, networked computing systems.

BACKGROUND ART

Many workflows require a plurality of process steps to be executed by a plurality of performers (e.g., machines and/or people) in order to realize an objective. For example, printing workflows typically involve several process steps, often performed at disparate locations. For example, in a simple printing workflow, a publisher generates content for delivery to a printer, who in turn transforms the content in a series of pre-press operations, often performing such functions as color correction and imposition. Typically, the printer must also deliver the pre-press output back to the publisher for proofing. After several possible iterations of transformation and approval, printing plates are produced.

In the past, such process steps were performed manually with physical objects. For example, original artwork was used to produce four color films, which were exposed onto photosensitive materials to produce proofs for determining color correctness. If modifications were required, the process steps were repeated. When the proofs were finally approved, printing plates were produced. The logistics of even this simple workflow were time consuming and expensive.

In digital printing systems, the content is supplied as digital data and many of the process steps are performed by computers. However, the material is still commonly delivered by conventional means and each process step is typically initiated by a human operator. For example, a publisher creates digital files representing the content and stores them on a disk. The disk is then physically shipped to the printer, who downloads the files from the disk to a computer. Each file is verified and possibly proofed for correctness. Transformations are performed on the computer, one file at a time, with the aid of a human operator. Proofs are produced and sent back to the publisher for approval. After final approval, printing plates are produced from the digital files. This manual movement and operation is costly, time consuming, and difficult to track.

Considerable effort is expended in an attempt to control and streamline these workflows. Flow charting applications and other specialized workflow drawing programs have been used to record existing workflows, design new workflows, and specify new process steps. Although these tools facilitate the understanding of workflows, they do little in the way of reducing cost or automating otherwise manual operations.

Workgroup applications, such as Lotus Notes®, have been used to manage the flow of information, but centralized, proprietary servers are often required to supervise the workflow. For this reason, these applications typically have only been useful to implement a workflow wholly contained within a single organization, or within a group of organizations, each of which is controlled by central servers (e.g., Lotus Notes®). Further, these centrally controlled workflows require the information processing to be accomplished in a manner compatible with the central server, thereby restricting the workflow devices that may be used. Still further, these workgroup applications are intended to simplify the flow of information from person to person, with automation being limited to messaging related to this flow. Consequently, human operators are still required to perform the necessary work, albeit often with the aid of a computer application.

SUMMARY OF THE INVENTION

The present invention implements a plurality of process steps by processing devices at potentially disparate locations. The process steps are executed independently and even complex workflows can be undertaken quickly and inexpensively.

In accordance with a first aspect of the invention, a device operable to execute a function included in a workflow to be implemented by a device network including the device is provided. The apparatus comprises means for accepting from the device network a workflow file that defines the workflow and identifies the function to be executed by the device. The apparatus also comprises means responsive to the accepting means and the workflow file for executing the function according to the workflow file and independently of the device network.

In the preferred embodiment, the workflow file may identify a parameter required to execute the function, and, the executing means may be responsive to the parameter. In such an instance, the function may comprise a first operation and a second operation. Further, the parameter may specify an authorization code for the first operation. Still further, the executing means may comprise means responsive to the authorization code for performing the first operation and means responsive to the performing means for electing whether to execute the second operation.

The transmitting means may include means for sending the second data to the second device with the modified process data. Further, the initiating means may be operable after the particular step is executed; and/or the apparatus may optionally be remote from the first and second devices. Further, the device may comprise memory wherein the accepting means comprises means stored in the memory for recognizing the workflow file.

Still further in accordance with the preferred embodiment, the device network may comprise an antecedent device and a communication link between the antecedent device and the device. In addition, the accepting means may comprise means for receiving the workflow file via the communication link from the antecedent device. In such an instance, the antecedent device may be remote from the device and the antecedent device may comprise an initiating device. Further, the device may comprise the initiating device. In addition, the workflow file may identify the antecedent device and a corresponding antecedent function to be executed by the antecedent device.

Still further in accordance with the preferred embodiment, the device network may comprise a subsequent device and a communication link between the device and the subsequent device. Further, the workflow file may identify the subsequent device. In such an instance, the device may further comprise means responsive to the workflow file for generating a modified workflow file in response to the executing means and, means responsive to the modifying means for sending the modified workflow file to the subsequent device via the communication link. In addition, the subsequent device may be remote from the device. Further, the device network may comprise a network selected from the group consisting of an intranet, a wide area network, a local area network, a telecommunications network, and an Internet. Still further, the device may comprise means for receiving process data, wherein the executing means may comprise means for modifying the process data to obtain modified process data. The device may further comprise, means for transmitting status information to an observing device identified in the workflow file. In such an instance, the device may be in combination with the observing device.

In accordance with another aspect of the present invention, an apparatus for implementing a particular process step after a prior step is executed by a first device and before a subsequent step is executed by a second device is provided. The apparatus comprises means for accepting a workflow file from the first device, the workflow file including a first indication identifying the particular process step and a second indication identifying the second device. The apparatus also includes means responsive to the first indication and operable substantially independent of the first and second devices for executing the particular step. In addition, the apparatus is provided with means responsive to the second indication and operable after the particular step is executed for sending the workflow file to the second device.

In accordance with yet another aspect of the present invention, a system for performing a sequence of first and second process steps is provided. The system comprises means for developing a workflow file representing the sequence of process steps. The system also includes first and second computing devices including first and second means for executing the first and second process steps, respectively, in a substantially autonomous manner. In addition, the system is provided with means for sending the workflow file from the first processing device to the second processing device after the first computing device has executed the first process step.

In accordance with still another aspect of the present invention, a distributed network is provided. The distributed network comprises a plurality of computing devices and means for linking the computing devices together. Each computing device includes means for accepting a workflow file, the workflow file including an indication of a function to be performed by the computing device and an indication of an ordered sequence of computing devices in the network, each computing device further including means operable substantially independent of other computing devices in the network for performing the function and means for sending the workflow file to a next computing device in the ordered sequence once the function has been performed.

In accordance with a further aspect of the present invention, a method of operating a particular computing device is provided. The method comprises programming the computing device to accept a workflow file, wherein the workflow file includes an indication of an ordered sequence of computing devices including the particular computing device and wherein the workflow file further includes an indication of a function to be performed by the particular computing device. The method also comprises causing the particular computing device to perform the function. Further, the method comprises operating the particular computing device to send the workflow file to another computing device in accordance with the ordered sequence.

In accordance with yet a further aspect of the present invention, an apparatus for implementing a particular process step after a prior step is executed by a first device and before a subsequent step is executed by a second device is provided. The apparatus comprises means for accepting first limited workflow data from the first device, the first limited workflow data including a first indication identifying the particular process step and a second indication identifying the second device. The apparatus also comprises means responsive to a first control signal and operable substantially independent of the first and second devices for executing the particular step. Additionally, the apparatus comprises means responsive to the second indication and operable after the particular step is executed for sending a second control signal to the second device.

Using the present invention, workflow details can be hidden from people who simply desire work products. No time is wasted contemplating and communicating details that are already known or not of interest. Each process step of a workflow is independent, and can therefore be mixed and matched to meet different requirements and individually refined for overall optimization. Execution and communication are automatic, decreasing costs and cycle times. Complex workflows remain consistent, increasing quality and facilitating continual improvement.

BRIEF DESCRIPTION OF THE DRAWINGS

These and other features and advantages of the present invention will become more apparent from a detailed consideration of the following detailed description of certain preferred embodiments when taken in conjunction with the drawings in which:

FIG. 3 is a sample workflow text file;

DESCRIPTION OF THE PREFERRED EMBODIMENTS

Although the following description focuses on a system and apparatus for automatically executing process steps by computers over a network, persons of ordinary skill in the art will readily appreciate that the techniques of the present invention are in no way limited to networked computers. On the contrary, any processing device or device capable of performing a function in accordance with instructions provided by any communication channel may be utilized in the context of the present invention. It shall also be recognized that any communication medium may be implemented. As noted in greater detail hereinafter, such devices might include dedicated machinery not traditionally considered a computer, such as a digital printing press, a household appliance, or a consumer electronics device. Generally, the present invention enables these devices to respond automatically to a workflow file that defines a sequence of process steps to be executed and optional process data to be used by and/or transformed from, one device to the next.

Figure 1:
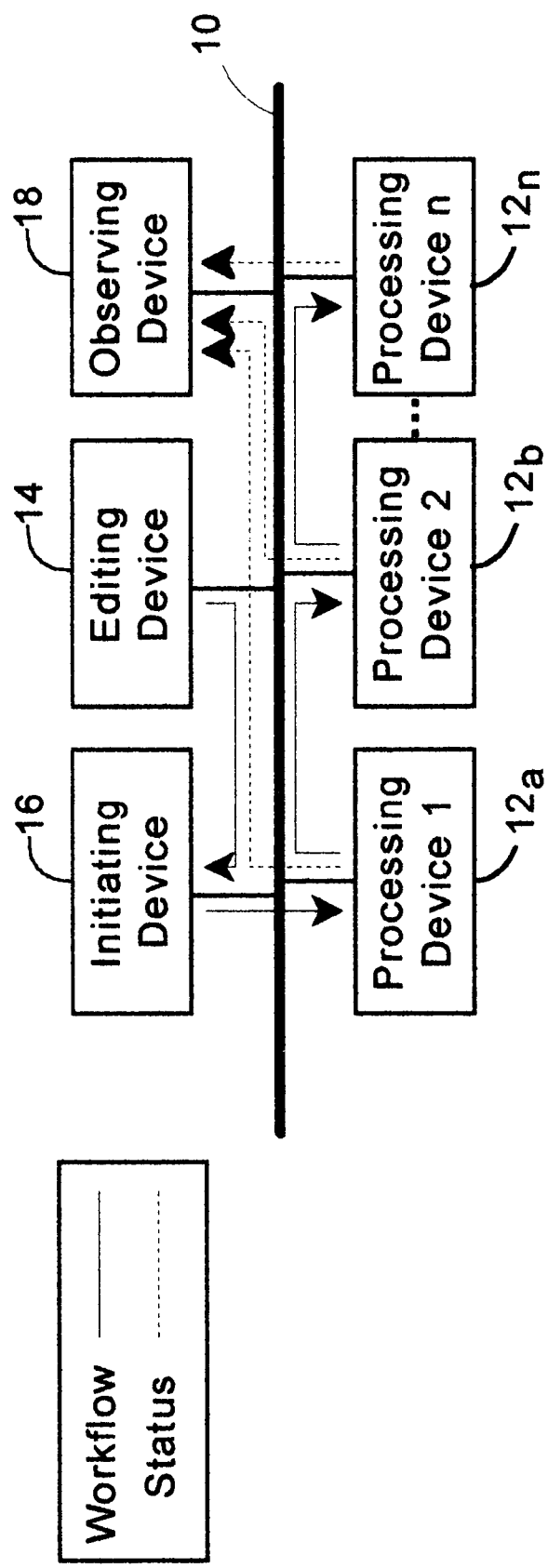
FIG. 1 is a block diagram of a typical computer network capable of utilizing the present invention.

FIG. 1 illustrates a typical distributed computer network capable of utilizing the present invention. A conventional communication channel 10 is shared by a plurality of disparate processing devices $12_a$, $12_b$, . . . $12_n$, capable of executing functions a,b, . . . n, respectively, an editing device(s) 14, an initiating device(s) 16, and an observing device(s) 18. Typically, one or more of these computing devices may be located in a physically remote location relative to one or more of the other devices. Workflow data are created by the editing device 14 and transferred from one processing device 12 to the next (e.g., from an antecedent device, to a current device, to a subsequent device). Workflow data includes a workflow file and, optionally, process data file(s). The workflow file contains an indication of a sequence of process steps to be executed by the disparate processing devices 12 and, optionally, data specifying a location of process data file(s) and/or status information. The process steps may be responsive to process parameters specifying variables associated with a particular process step. Process data files contain data to be used and/or transformed by the processing devices 12.

As is well known in the art, the communication channel 10 could be any type of link capable of conveying information (e.g., digital data), such as a direct hard-wired connection, land-based telecommunications network, cellular radio channels, satellite channels, fiber optic lines, coaxial cable, twisted pair copper wiring, etc . . . Preferably, the communication channel 10 connects to a communications network such as the Internet, an intranet, a local area network, or a wide area network.

Optionally, the communication channel 10 carries status information from the processing devices 12 back to an observing device 18 and/or any other device for observing the progress of the workflow. For example, an observer could be a personal computer with a graphical representation of a workflow file. As the workflow progresses, portions of the graphical representation may be highlighted to indicate the progression of the sequence of process steps. Status information may include reports of normal and erroneous process step completion and/or any other information regarding the workflow. Means for transmitting and/or receiving status data, or any other data, may be provided in any or all of the processing devices 12 and/or any number of observing devices 18. Further, status data or any other data may be transmitted and/or received by software and/or a circuit, as is well known to persons of ordinary skill in this art.

Each processing device 12 executes one or more of the process steps specified in the workflow file. For the purpose of simplicity in description only, a typical processing device 12 may be a personal computer. In actual practice there could be a large number of processing devices 12, each of which implements a set of process steps it is capable of executing. In the personal computer context, these process steps may correspond with the execution of particular applications or software routines. For example, a process step may include a first routine directed to authorization and a second routine that performs a certain function only if a proper authorization code has been supplied to the authorization routine. In this instance, the proposed authorization code may be provided to the processing device 12 as a parameter associated with the process step having the authorization routine.

In one embodiment of the present invention, a single device or multiple devices could be used to edit, initiate, and/or observe the workflow. Again, each such device may be a personal computer. Of course, the editing device 14, initiating device 16, and/or observing device 18 could also be used as a processing device 12. Further, one or several devices may be used to edit, initiate, and/or observe a particular process step, or a set of process steps rather than an entire workflow, if desired.

Figure 2:
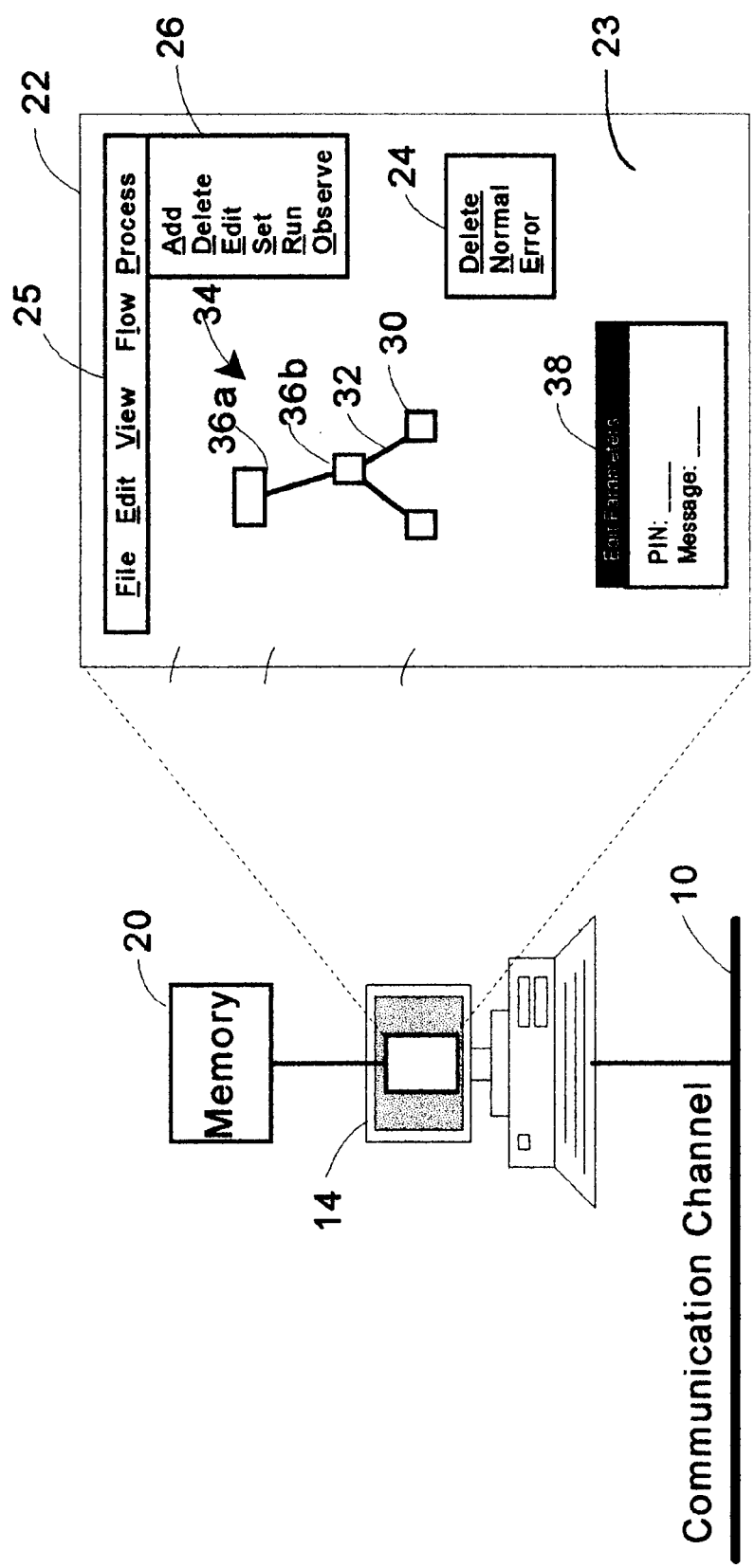
FIG. 2 is a more detailed diagram of the editing/initiating device of FIG. 1.

FIG. 2 is a more detailed diagram of the editing device 14, which is responsible for developing a workflow file. The editing device 14 executes a workflow editing application. In one embodiment of the present invention the workflow editing application is a stand-alone application. However, an add-in component for a web browser such as a Java® applet in Netscape Navigator® or an ActiveX® control in Internet Explorer® could likewise be used. The workflow editing application is preferably stored locally in memory 20, but is alternatively retrieved over the communication channel 10. The workflow editing application includes a user interface 22 preferably having a canvas 23 where graphical workflow representations 34 may be created and/or edited. Pop up menus 24 are preferably available to access commands of the workflow editing application. Optionally, a menu bar 25 with drop down menus 26 is available for accessing such commands. Commands to the workflow editing application may be invoked by selecting an option in a menu, selecting an icon, and/or pressing a key or a sequence of keys on a keyboard. It will be appreciated that other methods of invoking application commands well known to those of ordinary skill in the art may be used.

To create or modify a workflow, a new or existing workflow file is opened via a command to the workflow editing application. Preferably, a workflow designer creates a new workflow by selecting "New" from a "File" menu in a main window of the workflow editing application. Similarly, a workflow designer may modify an existing workflow by selecting "Open" from the "File" menu. Of course, any method of invoking a command will suffice. Preferably, the workflow files are displayed in separate windows on a computer monitor or in any other fashion as a graphical workflow representation 34 by the workflow editing application. In the preferred embodiment a graphical user interface (GUI) such as Microsoft Windows® is used to display and edit the graphical workflow representation 34.

Next, icons 30 are selected and placed on the graphical workflow representation 34. Icons 30 are preferably selected from lists of process steps. Lists of process steps may be created from existing workflows, or may be entered manually, retrieved from memory 20, gathered from one or more central libraries over the communication channel 10, gathered from one or more processing devices 12 over the communication channel 10, and/or any combination of the aforementioned and/or any other known technique. In this manner, processes may be available to a workflow designer as they are released from process providers, without the need for additional action by the workflow designer (i.e., dynamically discovered). For example, an editing device 14 may initiate a search for such processes over a network in any know fashion. Icons 30 are preferably placed on the graphical workflow representation 34 by pressing and releasing a pointing device button twice (e.g., double-clicking a mouse) while a cursor is over a text representation of an icon 30 (i.e., a process step) in a list. Optionally, icons 30 may be placed on the graphical workflow representation 34 by pressing a key on a keyboard while a process step is highlighted. For example, a workflow designer could highlight a particular process step in a list of process steps by moving through the list using arrow keys. Subsequently, an icon 30 could be selected and placed on the graphical workflow representation 34 by pressing an <enter> or <return> key. Alternatively, icons 30 may be placed on the graphical workflow representation 34 in a well known drag-and-drop manner. Preferably, an icon 30 associated with the process step is retrieved from an associated processing device 12 and placed on the graphical workflow representation 34. Alternatively, an icon 30 may be loaded from another device or generated by the workflow editing application.

Preferably, icons 30 placed on the graphical workflow representation 34 indicate the current status of the associated process step. For example, an icon 30 may be displayed with a green border indicative of a process step capable of performance by a processing device 12 that is communicating with the current device (e.g., editing device 14, initiating device 16, and/or observing device 18). Similarly, an icon 30 displayed with a red border may be indicative of a process step to be performed by a processing device 12 that is not communicating or, optionally, is unable to execute the process step. Further, an icon 30 displayed with a black border may be indicative of a process step to be performed by a processing device 12 that has not been checked for status (e.g., when the editing device 14 is not currently connected to the communication channel 10). It will be readily appreciated by those of ordinary skill in the art that any number of status indications could be made using any number of well known graphical indication techniques. For example, tags (i.e., text labels) could be placed on or near an icon 30. Tags could optionally appear only when a pointing device is on or near an icon 30. Similarly, symbols indicative of status information could be employed. Further, lists of available process steps could similarly indicate an associated status.

Once an icon 30 is placed on the graphical workflow representation 34, a process editing application associated with that icon 30 may be executed to define any parameters for that process. In other words, to the extent that a particular process step requires parameters to be identified, the corresponding process editing application will demand such information. Preferably, the process editing application is retrieved from a processing device 12 over the communication channel 10. In the preferred embodiment, the workflow editing application sends a request to the processing device 12 over the communication channel 10, which, in turn responds with the process editing application and optionally an icon 30 for representing that process step. The process editing application is preferably an applet such as a Java Bean®, but could be any type of application. Alternatively, the process editing application could be retrieved only when it is required for editing a particular process step. Further, such process editing applications may be retrieved from devices other than the associated processing device 12. Still further, process editing applications may be cached by the editing device 14 or may be otherwise locally available, in which case retrieval over the communication channel 10 would be unnecessary. Once retrieved, the process editing application is preferably executed locally on the editing device 14. However, execution may occur on a remote device in combination with user interface functions occurring locally, in which case retrieval of the process editing application over the communication channel 10 would be unnecessary.

Each process editing application is preferably executed by right-clicking on an icon 30 and selecting "Show Process Editor" from a pop-up menu. Alternatively, a process editing application may be executed when an associated icon 30 is placed on the graphical workflow representation. Of course, any method of invoking a command to the workflow editing application could cause the workflow editing application to execute a process editing application. For example, double clicking on an icon 30, could cause the workflow editing application to execute the process editing application associated with that icon 30.

In accordance with one embodiment of the present invention, one or more optional process parameters are specified using the process editing application. Process parameters comprise parameter data that a processing device 12 requires in order to execute the particular process step associated with that processing device 12. For example, a process step for sending a paging message may require a personal identification number (PIN) and a message to send. Preferably, each unique process step has a unique process editing application associated therewith, designed to assist a workflow designer in specifying its process parameters. For example, the paging process step may be associated with a process editing application that prompts a workflow designer to enter the PIN, then, based on the type of pager associated with that PIN, prompts the user for a numeric, an alpha-numeric, or a voice message. The process editing application may communicate with servers over the communication channel 10. For example, the paging process editing application may query a database server maintained by the paging service to determine the type of pager associated with a particular PIN.

Optionally, certain process parameters may be specified by selecting dynamic parameter data by name (i.e., a published variable). A process step supplies the actual parameter data, referenced by the name, during or after execution of a process step. This supplied parameter data may then be used by a subsequent process steps as specified by the workflow. For example, a printing process step may publish an error message. The variable used to name that error message (e.g., $Error_Message) could then be used as a place holder for parameter data in a subsequent process step, such as a message to send in a paging process step. Published variables are preferably selected by right clicking on an icon 30 and selecting from a drop down list of published variable names. Alternatively, published variables may be entered as text into fields of a process editing dialog box.

With continued reference to FIG. 2, each process step and its associated icon 30 have one or more nodes 36. Workflow data flows from an output node 36a to an input node 36b. Preferably, each process step has one input node 36b and one or more output nodes 36a. An input node 36b accepts workflow data from other process steps. Some process steps may have more than one input node 36b (or a single input node 36b that accepts workflow data from more than one process step). For example, a process step that collects statistics from other process steps to generate a chart may be represented by an icon 30 having multiple input nodes 36b.

An output node 36a transmits workflow data to other process steps. Some process steps may not have an output node 36a. For example, a process step for sending a paging message may be represented by an icon 30 with no output nodes 36a. Other process steps may have just one output node 36a. For example, a process step for encrypting a digital file may simply pass the encrypted file on to a next process step. Often, however, a process step will have two output nodes 36a, one output node 36a indicative of normal completion of the process step and one output node 36a indicative of an error during execution. Further, any number of output nodes 36a are possible. For example, a process step for verifying purchase orders may have three output nodes 36a: a first indicative of an error in a submitted document, a second for orders above a predefined dollar amount, and a third for orders below the predefined dollar amount.

A workflow sequence is specified by linking the nodes 36 of icons 30 together. Each icon 30 may represent a process to be executed by a separate processing device 12 (i.e., a device sequence). However, one processing device 12 may execute more than one process step. A workflow sequence may be sequential (e.g., process A, then process B, then process C) or complex. For example, when process A is completed, workflow execution may continue with process B or process C, depending on the results of process A. Linking icons 30 together comprises selecting an output node 36a of one icon 30 and selecting an input node 36b of another icon 30. Preferably, selecting an output node 36a comprises placing a cursor over the icon 30 and pressing a key or button. For example, an output node 36a could be selected by moving an arrow over an icon 30 with a mouse, right-clicking the mouse button and selecting a "Connect" command, highlighting the desired output node 36a in a pop-up 24 menu by dragging the cursor over it with the mouse, and selecting the output node 36a by clicking the left mouse button (left-clicking). Subsequently, a line may be drawn from one icon 30 or node 36 to another icon 30 or node 36 by pressing a button or key while a cursor is over the one icon 30 or node 36 and releasing the button or key while the cursor is over the other icon 30 or node 36. Preferably, each icon 30 has only one input node 36b, therefore, selecting the input node 36b could comprise left-clicking on the icon 30 itself Alternatively, input nodes 36b could be selected by right-clicking to display a list and left clicking to select a member of the list (as previously described for output nodes 36a). Persons of ordinary skill in the art will readily appreciate that many other methods of selecting input and output nodes 36 could be used. For example, a table allowing text to be selected and/or manually entered could be used to list input nodes 36b and the corresponding output nodes 36a thereby establishing links.

Once a link is established, a link element 32 is displayed. Preferably the link element 32 comprises a line connecting the two icons 30 with an arrow head indicating the direction of the workflow from output node 36a to input node 36b. A tag (e.g., a text label) is preferably displayed on or near the link element 32 to indicate the output node 36a that the link originates from.

A single output node 36a may connect to multiple input nodes 36b, thereby creating parallel workflow paths. For example, a printing process step may have an error output node 36a linked to the input nodes 36b of a paging process step as well as a logging process step. The paging process step could notify someone that an error has occurred, while the logging process step records information about the error to a log file.

Similarly, multiple output nodes 36a may connect to a single input node 36b, thereby merging parallel workflow paths. For example, a plurality of voting process steps may all link to a tabulating process step. Each of the voting process steps could collect information from a particular person or device in parallel. The tabulating process step could summarize the collected information.

Process steps, process parameters, links and other data are preferably saved to the memory 20 as a workflow file including indications of functions to be performed by computing devices, and an indication of an ordered sequence of computing devices to perform the functions. Data could be written to more than one memory device periodically or in response to a command. For example, workflow files could be saved to a volatile memory (random access memory) temporarily as needed and saved to a non-volatile memory (e.g., magnetic disk) in response to a command. Many media and algorithms for storing files are well known to persons of ordinary skill in the art.

Workflow files can also be saved as a single process step for other workflow designers to incorporate into their workflows (i.e., an encapsulated workflow). Workflow files saved as a single process step appear as a single icon 30, optionally with an identifying graphic, in other graphical workflow representations 34. However, all of the process steps associated with the single icon 30 are preferably written to the workflow file of any graphical workflow representation 34 incorporating an encapsulated workflow. In an alternate embodiment, data specifying a location of an encapsulated workflow file may be written to a current workflow file, instead of writing all of the process steps to the current workflow file.

Illustrated in FIG. 3 is an exemplar text based workflow file. In a preferred embodiment, a binary file (e.g., a Java® Serialization Object) is used, in as much as binary files are typically more bandwidth efficient in the instant application. Many other data fields, data structures, layers of abstraction, etc., as are well known to persons of ordinary skill in the art, may be used instead of or in conjunction with the formats described.

Process steps, represented by icons 30 on the graphical workflow representation 34, may be saved in an identification section of the workflow file as a name and an address. For example, a print process step executed by a process device at RR Donnelley and Sons Company could be represented in a workflow file in a section titled Identification:, wherein the name of the process step could be represented by Name="Print" and the address of the processing device (e.g., an Internet Protocol address) 12 could be represented by Address="RRDonnelly.com/print__process" (see FIG. 3). The name of the process step preferably serves as the name of the input node 36b when there is only one input node 36b.

Process parameters, specified by the process editing applications, may be saved in a parameters section of the workflow file as a parameter name associated with a parameter value. For example, the print process step may need two parameters. The parameters could be represented in a section titled Parameters:. The first parameter may be a file to be printed, identified by its network address (e.g., File= "customer.com/file1"). The second parameter could be the font to use when printing (e.g., Font="Times"). Of course, any number of parameters may be saved.

Links, represented by link elements 32 on the graphical workflow representation 34, may be saved in a links section titled Links: as a list of output node 36a names and associated process step names (i.e., the input nodes 36b they are linked to). For example, the print process step may have two output nodes 36a, one for normal completion and another in case an error occurs. In this example, the first output node 36a may be linked to a first paging process step to notify someone that the file has printed successfully (e.g., Normal= "Page1"); and, the other output node 36a may be linked to a second paging process step to notify a technician that an error has occurred (e.g., Error="Page2"). The names of the output nodes 36a are preferably arbitrary, but unique within a process step and/or workflow file. It should be noted that the name identifying a process step preferably (although not necessarily) serves as the name of its input node 36b.

After a workflow file has been created or modified, and preferably saved to the memory 20, execution of the workflow may be initiated. An initiating device 16 initiates a workflow by retrieving the associated workflow file from the memory 20 and transmitting the workflow file to the first/next processing device 12. Optionally, the initiating device may also serve as the first processing device. In such an instance, transmission of the workflow file may be unnecessary. Often, the editing device 14 will also function as the initiating device 16, initiating a workflow by invoking a command to the workflow editing application. Alternatively, a remote device such as a two-way pager or cellular telephone may invoke an initiating command by transmitting a predefined signal to an initiating device 16. Preferably, the initiating device 16 scans the workflow file to determine the address of the first/next processing device 12. For example, the name of the next processing device 12 could be represented by next process pointer (e.g., Next_Process= "Print"). The address of the next processing device could then be determined by scanning the workflow file for Name="Print" and extracting RRDonnelly.com/print_process from the associated Address field.

Once the address is determined, the initiating device 16 preferably transmits a request to establish a communication link with the first processing device 12. The initiating device 16 then transmits the workflow file to the first processing device 12, preferably in response to an acknowledgment from the first processing device 12. Alternatively, the initiating device 16 could transmit the workflow file to an intermediate device, which in turn could transmit the workflow file to the first processing device 12 or to another intermediate device. Although the initiating device 16 may retain a copy of the workflow file for accounting reasons, it is not necessary that it do so. Once a workflow has been initiated, it continues to execute substantially independent of other devices in a substantially autonomous manner (i.e., without central supervision).

It will be appreciated by persons of ordinary skill in the art that many other methods of transmitting a file are well known. For example, a direct connection and/or any type of network connection could be used. Further, any protocol may be used and the acknowledgment may not be required. Still further, well known encryption and/or compression techniques could be used. Yet further, all of workflow data may be transferred together over a common medium; or, workflow data may be separated by type and/or packetized and transferred from one processing device 12 to another processing device 12 using different physical mediums and/or different protocols.

In response to receiving the workflow file from the initiating device 16, the first processing device 12 preferably scans the workflow file for the name of the process step to be executed (function to be performed) and the values of any parameters to be used (e.g., Next_Process="Print"). For example, a processing device 12 that is to perform the process step named "Print" in the sample workflow of FIG. 3 could scan the workflow file until it found Name="Print". Subsequently, the processing device 12 could extract the location of the file to be printed and what font the file should be printed in. Of course, any number of process parameters could be used.

As in this example, some process steps may need to retrieve process data in order to execute. For example, a process step for printing would typically require a data file to print. In the sample workflow of FIG. 3 an address of a file to print is provided by the process parameter File= "customer.com/file1". Accordingly, the processing device 12 would retrieve the file over the communication channel 10 or over another connection in a known manner. In some instances, a data file may be sent without a processing device 12 specifically requesting it. Further, the data file may be sent together with the workflow file or separate from the workflow file. Still further, in the event that a data file is sent, it may be sent over the same connection as the workflow file or a different connection.

After a process step is identified and any required process parameters and/or process data are retrieved, the particular process step is executed by the processing device 12. For example, the print process step would print the file. Significantly, each processing device 12 preferably executes processes local to that particular processing device 12, and native to that processing device 12 (e.g., in its language using its microprocessor). A process step may modify or create a file(s), in which case the file(s) would be written to the appropriate location during execution of the process step. For example, a color correction process step could retrieve a data file, perform a color correction step on the data file, and write the modified data file to a predetermined location (e.g., a location specified by a process parameter or a default location). Further, subsequent process steps may use the modified or created file(s) as process data. For example, an encryption process step may encrypt the color corrected file. Means for executing the process step and/or modifying the process data may include a microprocessor executing software instructions and/or an application specific integrated circuit (ASIC) as is well known to persons of ordinary skill in the art.

As a result of execution, a process step may also publish data directly to the workflow file (i.e., the workflow file may be static or dynamic) for other process steps to use. Typically, other process steps would use the published data as process data or process parameters, however, the published data could be used in any manner (e.g., the. output node of a link). For example, the print process step in FIG. 3 may publish the name of the file it attempted to print to a variable called File_Name. If printing were unsuccessful, the print process may publish an error message to a variable called Error_Message. The names of the variables are preferably arbitrary, and unique within a process step and/or workflow file. By publishing results of a process step, other process steps may use them as process parameters. For example, a message parameter of the "Page1" process step of FIG. 3 may include the name of the file (i.e., Message= "The file" & Print.File_Name & "is ready"). Similarly, a message parameter of the "Page2" process step may be an error message of the print process step (i.e., Message= Print.Error_Message). In this example the syntax followed treats text in quotes as literal text, ampersands as concatenation symbols, and text not in quotes as variables. The variable name in the example follows a convention of [Identification name].[Published variable]. Of course any consistent syntax could be used.

Further, a process step may write other data to the workflow file before, during, or after execution of a process step (i.e., the workflow file may be static or dynamic). For example, timestamps may be represented in a workflow file in a section titled Status:, wherein the time a particular process step started could be represented by Start=3/3/98 2:56:03 PM and the time a particular process step ended could be represented by End=3/3/98 2:56:21 PM.

Subsequent to execution of a process step, the current processing device $12_n$ effectively becomes the initiating device for the rest of the workflow by transmitting the workflow file to the next processing device $12_{n+1}$. The current processing device $12_n$ determines a link to follow by associating its completion status (e.g., Normal) with the name of another process step (e.g.,., "Page1"). Subsequently, the next process pointer is updated (e.g., Next_Process= "Page1"). Next, like the initiating device, the current processing device $12_n$ preferably scans the workflow file to determine the address of the next processing device $12_{n+1}$ and then transmits the workflow file to the next processing device. $12_{n+1}$. In the event that a workflow branches into multiple workflows, additional copies of the workflow file, with the appropriate process step(s) identified by the next process pointer, are transmitted to additional processing devices 12. As before, these processing devices 12 are identified by scanning the workflow file for an associated address.

Figure 4:
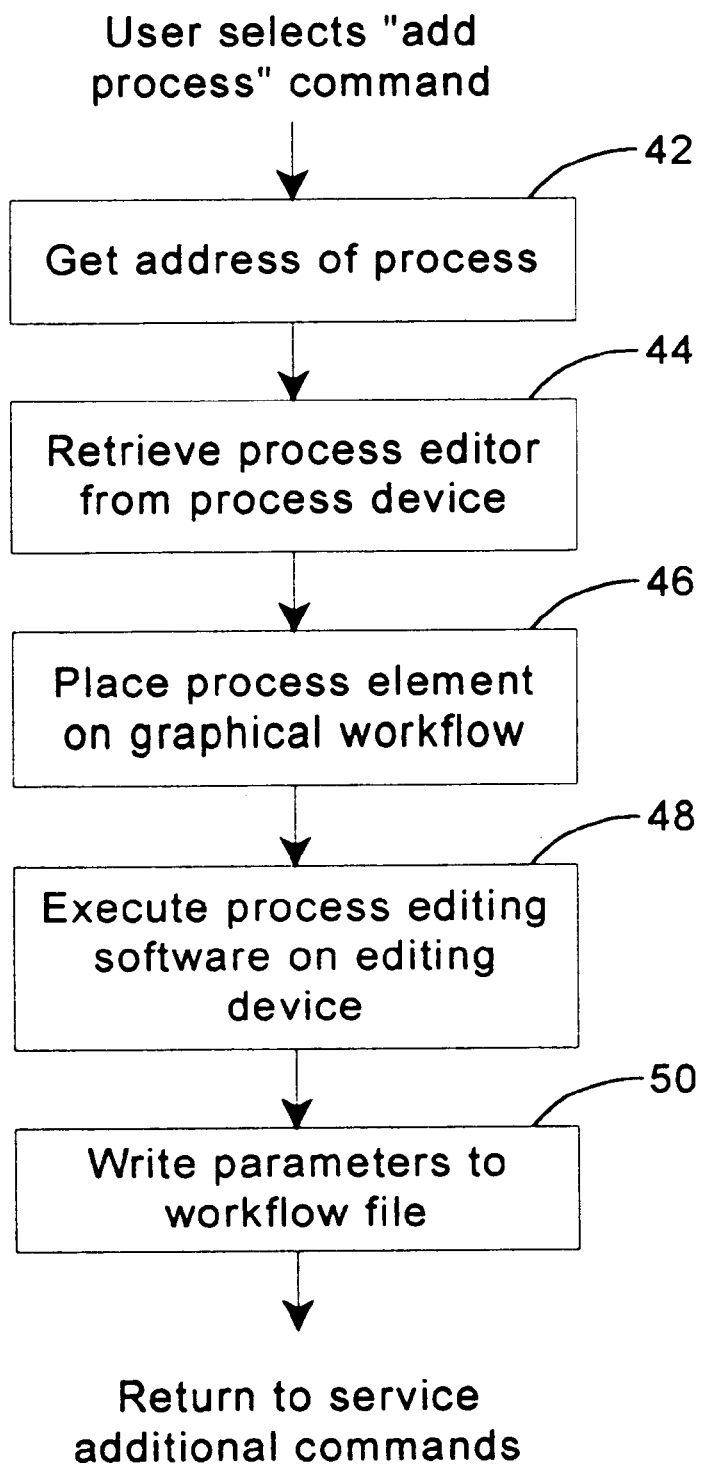
FIG. 4 is a flow chart of a program that can be implemented by the editing/initiating device of FIG. 1 to add a process step to a workflow.

FIG. 4 illustrates a program which may be implemented by the editing device 14 to add a process step to a workflow file. This program could be a sub-program to the workflow editing application 22. For example, a workflow designer may select "Add Process.From File" or "Add Process From Network" in a "Edit" menu 26 (or otherwise indicate a desire to add a new icon 30). After the add process command has been issued as set forth herein above, a block 42 obtains data specifying a location (e.g., an address) of a process step. The address specifies a processing device 12 and an identification or name of the process step on that processing device 12 to execute. Preferably, this is accomplished by presenting a list of process steps to the workflow designer for selection. The selection is translated to an actual processing device 12 address (if necessary) and process editing software associated with the process step is retrieved from the processing device 12 by a block 44. An icon 30 or other element representing the process step is placed on the graphical workflow representation 34 by a block 46. The icon 30 or other element is either generated locally or obtained from the processing device 12. The retrieved process editing software is executed locally on the editing/initiating device 14 by a block 46 to query the workflow designer for parameters specific to the selected process step. Assistance in selecting parameters could be built into the process editing software, or may be available via an Internet web page or any other source. The parameters are then written by a block 50 to the workflow file which specifies workflow process steps, link data, and parameters. The workflow editing application 22 thereafter services additional commands selected by the workflow designer, such as linking the new process step with existing process steps as previously described, deleting process steps by selecting an icon 30 followed by selecting "Delete" in a pop-up menu 24, saving the workflow file to memory 20 by selecting "Save" in the "File" menu, initiating workflow execution by selecting "Run" in the "File" menu, or adding observing devices.

Figure 5:
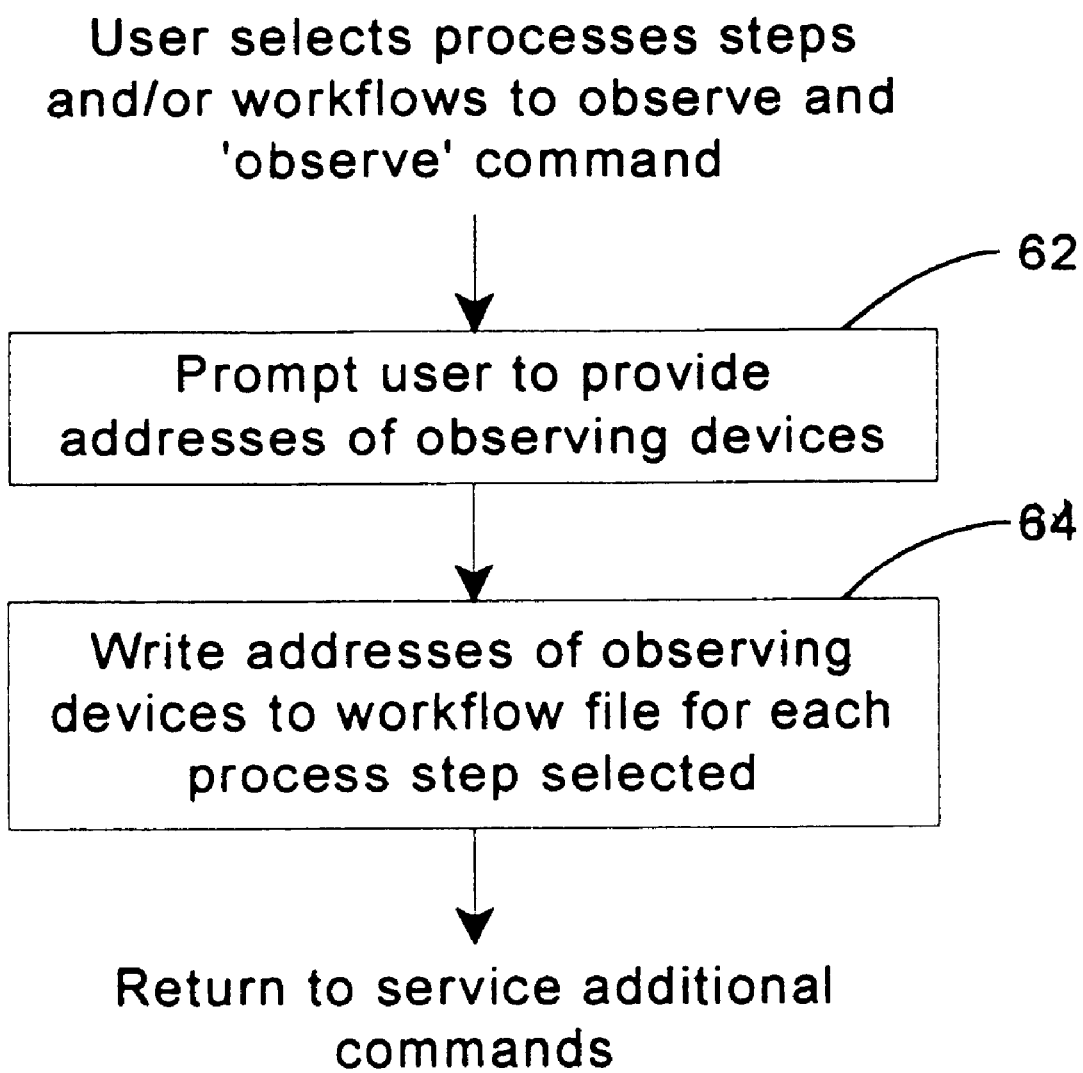
FIG. 5 is a flow chart of a program that can be implemented by the editing/initiating device of FIG. 1 to attach observing devices to process steps.

FIG. 5 illustrates a program which may be implemented by the editing/initiating device 14 to add an observing device to the workflow file. Again, this program could be a sub-program to the workflow editing application 22. In order to initiate such action the workflow designer preferably indicates any number of process steps (including the entire workflow) to be observed by highlighting them on the graphical workflow representation 34 and then issues a particular command to the workflow editing application (e.g., select "Observe" in a "Process" menu 26). A block 62 then prompts the workflow designer to enter data specifying an observing device (e.g., an Internet address), such as the editing/initiating device 14 currently being used to execute the editing application 22. This may be accomplished by presenting a list of potential observing devices to the workflow designer for selection. The selection is then translated to data specifying the observing device, such as an address. A block 64 then writes the address to the workflow file so each processing device 12 knows where to send status information as the workflow progresses. Thereafter, the workflow editing application 22 of FIG. 2 continues by servicing additional commands requested by the workflow designer.

Figure 6:
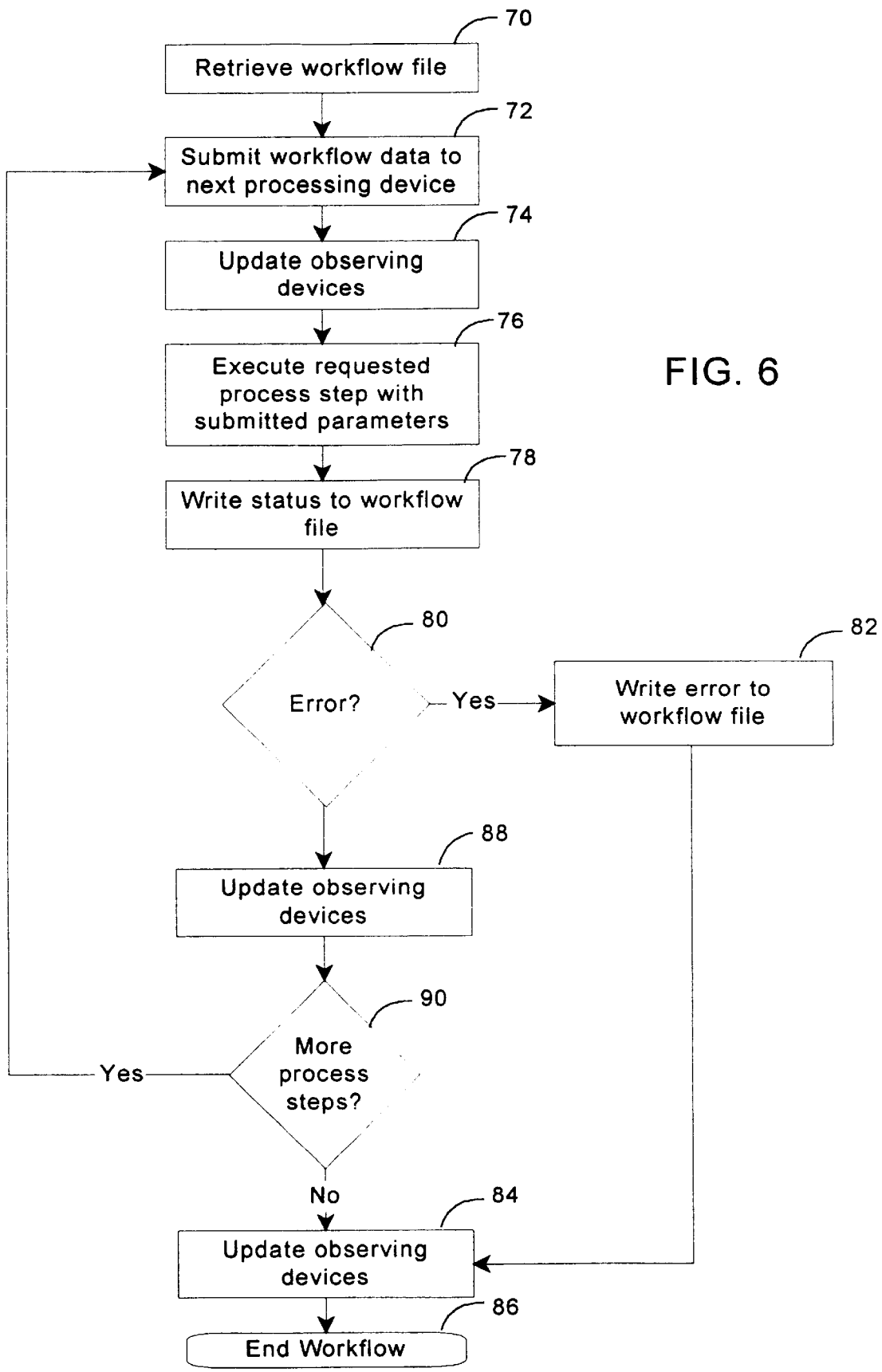
FIG. 6 is a flow chart representing the overall interaction of the devices of FIG. 1.

FIG. 6 illustrates the overall execution of an exemplar workflow in accordance with the teachings of the present invention. A workflow file is created by a workflow designer using the workflow editing application 22 or a previously created workflow file is retrieved from memory 20 by a block 70. Workflow execution is initiated by the initiating device 14 or any other device that submits a workflow file to a processing device 12. Alternatively, workflow execution may be initiated by a device sending a message to another device which, in turn, submits a workflow file to a processing device 12. For example, a telephone or two-way pager may send a message that directly or indirectly causes a personal computer or other initiating device 14 to submit an existing workflow file as a predetermined processing device 12.

During a first pass through the flowchart of FIG. 6, data specifying a location (e.g., an address) of a first processing device 12, are read from the workflow file and the entire workflow file, along with any process data files (e.g., data representing a digital image), are sent by the editing/initiating device 14 to the first processing device $12_a$ via the communication channel 10 by a block 72 executed by the initiating device 14. Alternatively, the workflow file may include data specifying the location(s) of process data files and the processing device $12_a$ may, in response to the receipt of the workflow file, retrieve the process data files from the location(s) specified. Then, a block 74 executed by the first processing device $12_a$ updates any observing devices monitoring the progress of the workflow. Observing devices are informed that a particular process step is executing or will soon be executing. In one embodiment, progress of the workflow is shown by developing suitable indications, for example, by highlighting the elements 30,32 of the graphical workflow 34 on a computer display to show completed process steps and errors. In another embodiment, the progress of the workflow is observed by notifying a party of the progression of the sequence of process steps via any suitable notification modality, such as an e-mail message, a phone message, and/or a paging message.

After updating observing devices, the process step indicated in the workflow file for this processing device $12_a$ is executed with the submitted parameters by a block 76 executed by the current processing device $12_a$. After executing the process step, a block 78 of the current processing device $12_a$ logs a status report to the workflow file. Status items include a start and end time for the process step and a completion disposition such as "normal completion" or "error." A block 80 executed by the current processing device $12_a$ checks for any processing errors. If an error occurs, such as the current processing device $12_a$ is not capable of executing the specified process step or submitted parameters are insufficient, then an error condition is written to the workflow file by a block 82 executed by the current processing device $12_a$. The observing devices monitoring the progress of workflow execution are informed of the error by a block 84 and workflow execution is terminated by a block 86. However, if no errors are detected by the block 80, observing devices monitoring the progress of the workflow execution are informed by a block 88 that a particular process step has successfully executed. Blocks 84, 86 and block 88 are executed by the current processing device $12_a$.

A block 90 executed by the current processing device $12_a$ then checks the workflow file to determine if more process steps need to be executed. If so, the block 72 (this time executed by the current processing device $12_a$) submits the workflow data (i.e., workflow file and process data files, if any) to a next processing device $12_b$ and the method repeats.

(The processing device $12_b$ becomes the "current processing device" in the next pass through the program.) If the block 90 executed by the current processing device ($12_a$, $12_b$, ... or $12_n$) determines that no process steps remain, any observers monitoring the progress of the workflow are updated a last time by the block 84 and workflow execution is terminated by the block 86. The blocks 84 and 86 are executed by the last processing device 12 executing the last process step of the workflow.

Figure 7:
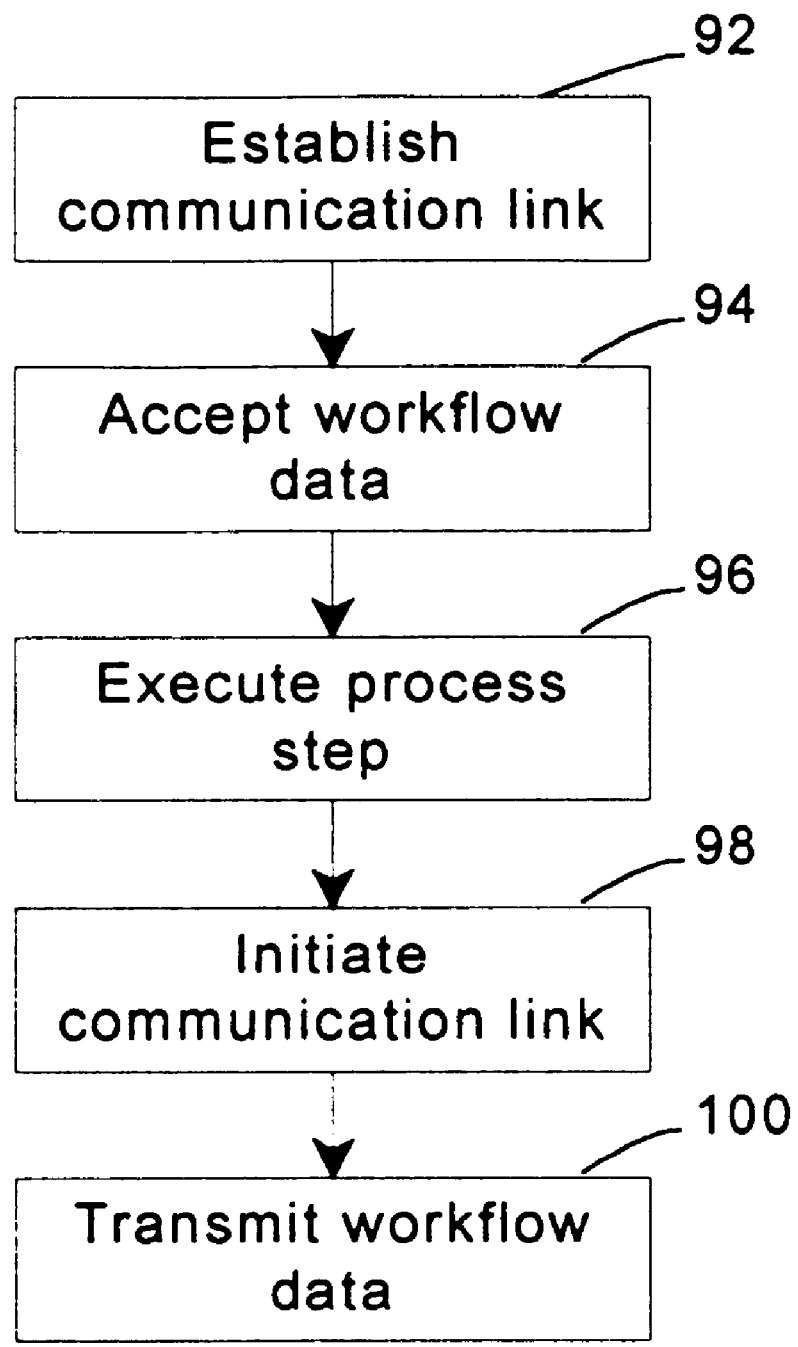
FIG. 7 is a flow chart of a program that can be implemented by the processing devices of FIG. 1 to execute a process step of a workflow; and, FIG. 8 is a flow diagram illustrating an alternate embodiment of workflow data transfer.

FIG. 7 illustrates a program which may be executed by any of the processing devices 12 to implement a particular process step in accordance with the teachings of the present invention. (In the description hereinafter, this processing device will be identified as $12_x$.) In response to a request from a preceding process device $12_{x-1}$ (which may comprise the editing/initiating device 14 or any of the processing devices $12_a$, $12_b$, ... $12_{n-1}$), a block 92 establishes a communication link over a communication channel 10 with the preceding processing device $12_{x-1}$, which may be at a location remote from the processing device $12_x$. The communication channel 10 could be a direct connection such as a RS-232 cable or a connection to a network, such as the Internet, an intranet, a LAN, a WAN, or the like. Thereafter, a block 94 accepts workflow data from the preceding processing device $12_{x-1}$. The accepted workflow data includes a workflow file which contains information identifying a particular process step, a subsequent step, and a subsequent processing device $12_{x-1}$ specified by the link data. The accepted data could also include initial process data and/or data specifying a location of initial process data file(s). As an example, the initial process data could represent a digital image that is ready for the particular process step of color correction and the subsequent step could be to create a proof of the digital image at a processing device comprising a digital proofer. Accordingly, a block 96 executes the particular process step (e.g., color correction), thereby modifying the process data to create a modified process data file. Thereafter, a block 98 establishes a communication link over a communication channel 10 with the subsequent processing device $12_{x+1}$ (e.g., the digital proofer), which may also be at a location remote from the processing device $12_x$. As before, the communication channel 10 to the subsequent processing device $12_{x+1}$ could be a direct connection such as a RS-232 cable or a connection to a network such as the Internet, an intranet, a LAN, a WAN, or the like. Finally, a block 100 transmits the workflow data, including the workflow file identifying the next processing device $12_{x+1}$ and the modified process data file (e.g., a data file representing a color corrected image) or data specifying a location of the modified process data (e.g., an Internet address pointing to data representing a color corrected image) to the subsequent processing device $12_{x+1}$.

Figure 8:
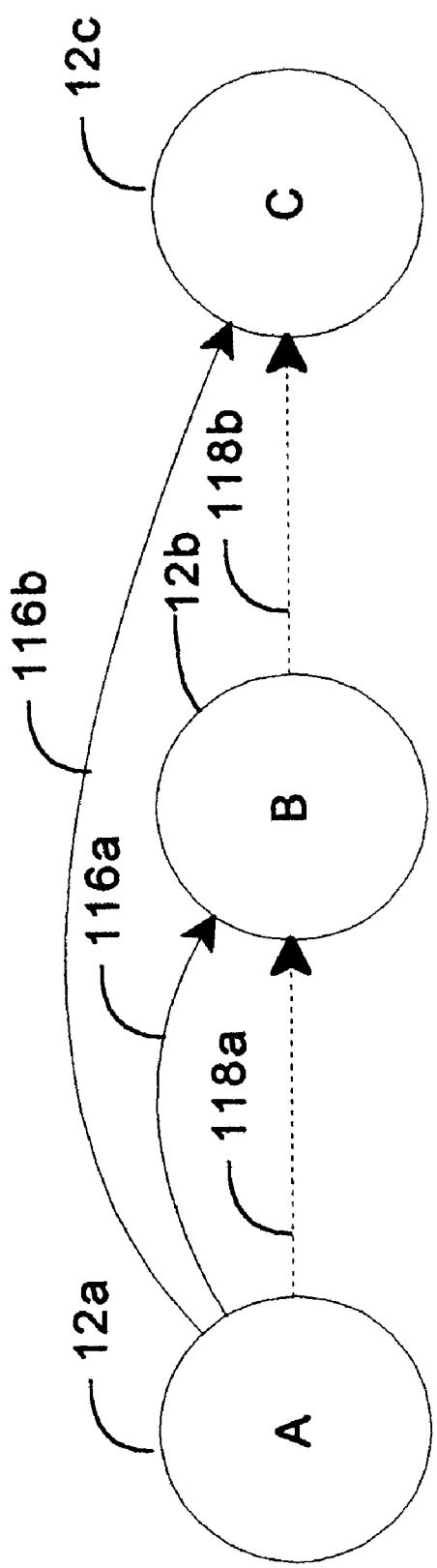

Illustrated in FIG. 8 is a flow diagram representing an alternate embodiment of the present invention. A processing device 12a and/or an initiating device 16 sends first limited workflow data 116a to a first processing device 12b and second limited workflow data 116b to a second processing device 12c. Limited workflow data includes function(s) (operations and optional parameters) that are relevant to that particular processing device 12 (and, perhaps, functions relevant to some but not all of the processing device(s) 12) and sequencing information related to processing step(s) subsequent to that particular processing device 12. Preferably, although not necessarily, identification information is included with the limited workflow data (e.g., name and time stamp of a workflow). Subsequently, the processing device 12a and/or an initiating device 16 sends a control signal 118a to the first processing device 12b. The control signal 118a may include process data and preferably includes the identification information to differentiate this workflow from other workflows employing the same processing device 12. After executing any relevant functions, the first processing device 12b determines the identity of the next processing device (e.g., the second processing device 12c) according to the limited sequence information it received. Accordingly, the first processing device 12b sends a control signal 118b to the second processing device 12c. Other processes are implemented thereafter in the same manner.

In summary, persons of ordinary skill in the art will readily appreciate that a system and apparatus for implementing process steps of a workflow has been provided. Systems and devices implementing the teachings of the invention can obtain decreased costs and cycle times as well as increased quality and productivity. Further, available bandwidth is utilized in an efficient manner as no central control server is needed to communicate with each of the processing devices 12. Messages are simply handed from one processing device 12 to the next, not from a processing device 12 back to the central control server and then to the next processing device 12. Still further, by not relying on a central control server, no confusion as to who is in control arises, thereby making workflow execution across computing systems and corporate boundaries much easier to implement.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of executing a portion of a workflow among a first processing device, a second processing device and a third processing device, wherein the first processing device, the second processing device and the third processing device are nodes in a peer-to-peer network, the method comprising:

receiving a workflow file at the second processing device from the first processing device, the workflow file including (i) information identifying the first processing device, (ii) information identifying a first process step which was previously executed by the first processing device, (iii) information identifying the second processing device, the information identifying the second processing device being different than the information identifying the first processing device, (iv) information identifying a second process step to be executed by the second processing device, (v) information identifying the third processing device, the information identifying the third processing device being different than the information identifying the first processing device, the information identifying the third processing device being different than the information identifying the second processing device and (vi) information identifying a third process step to be executed by the third processing device;

executing the second process step at the second processing device in response to receiving the workflow file from the first processing device;

writing status information to the workflow file at the second processing device; and transmitting the workflow file from the second processing device to the third processing device after executing the second process step.

2. A method as defined in claim 1 further comprising:

executing the first process step at the first processing device; and transmitting the workflow file from the first processing device to the second processing device after executing the first process step.

3. A method as defined in claim 2 further comprising:

executing the third process step at the third processing device; and receiving the workflow file at the third processing device from the second processing device.

4. A method as defined in claim 1 wherein receiving a workflow file at a second processing device comprises receiving a workflow file which includes process data used during executing of the second process step.

5. A method as defined in claim 1 wherein receiving a workflow file at a second processing device comprises receiving a workflow file which includes a process data location used during executing of the second process step.

6. A method as defined in claim 1 wherein receiving a workflow file at a second processing device comprises receiving a workflow file which includes an authorization code.

7. A method as defined in claim 1 further comprising updating an observing device by transmitting an indication that the second process step has been executed.

8. A method as defined in claim 1, wherein the status information includes a start time and a stop time associated with executing the second process step.

9. A method as defined in claim 8 wherein writing status information to the workflow file at the second processing device includes writing an error message to the workflow file if the second process step is not completely executed.

10. An apparatus for executing a portion of a workflow, the apparatus comprising:

a first processing device, a second processing device and a third processing device, wherein the first processing device, the second processing device and the third processing device are nodes in a peer-to-peer network; and a software program, the software program being structured to cause the second processing device to:

receive a workflow file from the first processing device, the workflow file including (i) information identifying the first processing device, (ii) information identifying a first process step which was previously executed by the first processing device, (iii) information identifying the second processing device, the information identifying the second processing device being different than the information identifying the first processing device, (iv) information identifying a second process step to be executed by the second processing device, (v) information identifying the third processing device, the information identifying the third processing device being different than the information identifying the first processing device, the information identifying the third processing device being different than the information identifying the second processing device and (vi) information identifying a third process step to be executed by the third processing device;

execute the second process step in response to receiving the workflow file from the first processing device;

write status information to the workflow file; and transmit the workflow file to the third processing device after executing the second process step.

11. An apparatus as defined in claim 10, wherein the software program is further structured to cause the second processing device to retrieve process data used during executing of the second process step from the workflow file.

12. An apparatus as defined in claim 10, wherein the software program is further structured to cause the second processing device to retrieve process data used during executing of the second process step from a network location.

13. An apparatus as defined in claim 10, wherein the software program is further structured to cause the second processing device to update an observing device by transmitting an indication that the second process step has been executed.

14. An apparatus as defined in claim 10, wherein the status information includes a start time and a stop time associated with executing the second process step.

15. An apparatus as defined in claim 14, wherein the software program is further structured to cause the second processing device to write an error message to the workflow file if the second process step is not completely executed.

* * * * *